(12) United States Patent
McQueen

(10) Patent No.: US 9,355,290 B2
(45) Date of Patent: May 31, 2016

(54) ERGONOMIC MACHINE-READABLE SYMBOL READER SYSTEM

(71) Applicant: Datalogic ADC, Inc., Eugene, OR (US)

(72) Inventor: Alexander M. McQueen, Eugene, OR (US)

(73) Assignee: DATALOGIC ADC, INC., Eugene, OR (US)

(*) Notice: Subject to any disclaimer, the term of this patent is extended or adjusted under 35 U.S.C. 154(b) by 0 days.

(21) Appl. No.: 14/307,311

(22) Filed: Jun. 17, 2014

(65) Prior Publication Data

US 2015/0363620 A1    Dec. 17, 2015

(51) Int. Cl.
*G02B 5/00* (2006.01)
*G06K 7/10* (2006.01)

(52) U.S. Cl.
CPC ................... *G06K 7/10821* (2013.01)

(58) Field of Classification Search
USPC ....................... 235/462.01–462.49
See application file for complete search history.

(56) References Cited

U.S. PATENT DOCUMENTS

| 4,093,865 A | * | 6/1978 | Nickl ........................ 250/566 |
| 4,789,775 A | * | 12/1988 | McClain et al. ......... 235/462.31 |
| 5,752,582 A | | 5/1998 | Hayward |
| 2010/0282850 A1 | | 11/2010 | Olmstead et al. |

FOREIGN PATENT DOCUMENTS

| JP | 6-266956 A | 9/1994 |
| JP | 8-329335 A | 12/1996 |
| WO | 2009/033991 A1 | 3/2009 |

* cited by examiner

*Primary Examiner* — Daniel Hess
(74) *Attorney, Agent, or Firm* — Seed IP Law Group PLLC

(57) ABSTRACT

Systems and methods that provide a machine-readable symbol reader positioned over a "flip-lid" type cash box. The reader may be affixed directly to the lid of the cash box or affixed to a thin cover pivotally attached to a checkout stand that opens with the lid of the cash box. The lid of the cash box or the thin cover may be level with a surrounding surface of the checkout stand. The reader may have a field of view directed away from the operator (e.g., a cashier) so that the operator may scan objects close to his or her body without requiring extended reaching, which provides an ergonomically desirable work environment.

21 Claims, 12 Drawing Sheets

ERGONOMIC MACHINE-READABLE SYMBOL READER SYSTEM

BACKGROUND

1. Technical Field

The present disclosure relates to machine-readable symbol reader systems.

2. Description of the Related Art

A checkout lane at a grocery store or other retail point of sale (POS) can be a demanding, high-pressure environment. A store employee operating a checkout stand (i.e., an operator or "checker") can be expected to provide exceptional customer service, which may include quickly totaling each customer's purchase and collecting payment. Rapidly processing customer purchases reduces the time other customers must wait to make their purchases. When a store is busy and checkout lines are long, operators can experience increased pressure to rapidly process customer purchases.

One method for improving the speed and efficiency of an operator is to provide a machine-readable symbol reader to allow the operator to quickly scan objects associated with machine-readable symbols. As a machine-readable symbol (e.g., barcode symbol, matrix code symbol) is passed through a scan volume (or scanning area), the machine-readable symbol is read by a machine-readable symbol reader, such as a scanner, and transformed into electrical signals. The electrical signals can be decoded into alphanumerical characters or other data that can be used as input to a data processing system, such as a POS terminal (e.g., an electronic cash register). The POS terminal can use the decoded data to, for example, look up a price for the article, apply electronic coupons, and award points for a retailer or other rewards program. Scanning a machine-readable symbol on objects enables rapid totaling of the price of such objects and thereby increases operator efficiency.

An object can have multiple sides, not all of which might be presented for or visible during scanning, depending on the shape of the object and the type of reader. For example, a simple six-sided rectangular box-shaped object can have a leading side (or side leading the object through the scan volume), a trailing side (opposite the leading side and last through the scan volume), a bottom side, a top side, a front side positioned nearest to or facing the operator (also known as the operator side), and a back side positioned away from the operator (also known as the customer side).

A significant amount of time for current checkout processing results from the operator grasping an object, orienting the object to present an optical code to a reader, moving the object past the reader's scan volume, and then bagging the object. The physical stress from moving objects past the reader may increase the potential for repetitive motion injuries.

Many readers associated with checkout stands are placed outside the ergonomically recommended work zone for an operator due to the requirement that a cash box needs to be placed in a checkout stand directly in front of the operator. Due to this placement of the cash box, the machine-readable symbol reader must be displaced a distance from the operator that is outside the operator's preferred work zone or even outside the operator's maximum work zone. This sub-optimal placement of the reader may increase the potential for work related fatigue or injuries.

FIG. 1 shows a conventional "flip-lid" type cash box 10 that is often used in geographic regions where operators scan objects while seated. The cash box 10 includes a base or body 12 that includes a bottom wall 14 and sidewalls 16 that define an interior volume 18 in which currency may be placed (e.g., bills, coins, checks, etc.). In the illustrated embodiment, the cash box 10 has a rectangular shape. The cash box 10 includes a top opening 20 disposed at the uppermost portions of the sidewalls 16 that allows access to the interior volume 18.

The cash box 10 also includes a lid 22 pivotally attached to the body 12 via hinges 24. The lid 22 is pivotable between an open position and a closed position to regulate access to the interior volume 18. The cash box 10 may be provided with a locking mechanism 26 that, for example, may be operated with a key.

FIGS. 2 and 3 show a conventional checkout stand 28 at which an operator 30 may be seated. The checkout stand 28 includes a top work surface 32, an input conveyor belt 34, and an output conveyor belt 36. The checkout stand 28 also includes a two-plane machine-readable symbol reader 38 that includes a horizontal reader portion 38A that views bottom sides of objects 40 through a horizontal window 42 and a vertical reader portion 38B for reading vertical sides of objects that include machine-readable symbols 44. The checkout stand 28 also includes a cash box reception portion 46 into which the cash box 10 may be mounted. For example, the cash box reception portion 46 may take the form of a shelf onto which the cash box 10 may be placed. The lid 22 of the cash box 10 is visible in the views of FIGS. 2 and 3.

When positioned inside the cash box reception portion 46 of the checkout stand 28 as shown in FIGS. 2 and 3, the cash box 10 is located directly in front of and adjacent to the operator 30 so that the operator may readily access the contents of the cash box during a transaction. The machine-readable symbol reader 38 is also placed in front of the operator 30, but is offset by a relatively large distance from the operator since the cash box 10 uses the space closest to the operator. FIG. 3 illustrates in dashed lines the recommended ergonomic work zones 48 and 50 for this type of labor operation. The zone 48 may be referred to as the "preferred work area" or "preferred work zone," which applies to reaching movements that have arm support and occur at a frequency greater than ten times per minute. This stipulation closely matches the movements necessary for scanning grocery or other retail objects. As can be seen, the entire preferred work zone 48 is outside the coverage of the horizontal window 42 of the reader 38.

The zone 50 may be referred to as the "maximum work area" or "maximum work zone," which is the zone for which greater reach is required and should not be used at high frequency, unlike the preferred work zone 48. Note that most scanning operations require the operator 30 to reach into the maximum work zone 50 to utilize the horizontal window 42 for scanning. Moreover, a portion of the horizontal window 42 is actually beyond the maximum work zone 50, which causes the operator 30 to reach beyond what is recommended.

BRIEF SUMMARY

A machine-readable symbol reader system may be summarized as including a work surface having a front edge at which an operator may be positioned, the work surface includes a movable surface portion disposed proximate the front edge, the movable surface portion movable to selectively provide the operator access to a volume disposed below the movable surface portion; and a machine-readable symbol reader physically coupled to the movable surface portion of the work surface to move therewith, the machine-readable symbol reader has a field of view directed away from the front edge of the work surface, the field of view at least partially defines a scan volume, and the machine-readable symbol reader reads a machine-readable symbol of an object within the field of view when the object passes through the scan volume. The movable surface portion of the work surface may be in the form of a lid of a cash box, and the volume disposed below the movable surface portion may be defined by a body of the cash box, the lid of the cash box pivotally coupled to the body of the cash box. The volume disposed below the movable surface portion may be shaped and sized to receive a cash box therein. The movable surface portion may be pivotal about a hinge. At least a portion of the machine-readable symbol reader may be positioned above a plane of the work surface to direct the field of view across the work surface, and at least a portion of the field of view may be directed downward from the machine-readable symbol reader. The movable surface portion pivots into a first position in which the movable surface portion may be level with an adjacent, non-movable surface portion of the work surface. The work surface may be part of a checkout stand.

The machine-readable symbol reader system may further include a bottom machine-readable symbol reader positioned below the work surface and distal of the movable surface portion, the work surface comprises a window, the bottom machine-readable symbol reader has a field of view directed upward through the window to capture an image of a side of the object facing downward, and the field of view of the bottom machine-readable symbol reader at least partially defines the scan volume.

The machine-readable symbol reader system may further include an input conveyor system that transports objects toward the scan volume; and a loading zone that receives objects transported through the scan volume.

A machine-readable symbol reader system may be summarized as including a cash box positionable at a checkout stand proximate a front edge thereof at which an operator may be positioned, the cash box includes: a body having a bottom wall and at least one sidewall extending upwardly from the bottom wall, the at least one sidewall defines an open top; and a lid pivotally coupled to the at least one sidewall to selectively close the open top, the lid includes a top surface and a bottom surface opposite the top surface; and a machine-readable symbol reader physically coupled to the lid to move therewith, the machine-readable symbol reader extends upward from the top surface of the lid, the machine-readable symbol reader has a field of view directed away from the front edge of the checkout stand when the cash box is positioned at the checkout stand, the field of view at least partially defines a scan volume, and the machine-readable symbol reader reads a machine-readable symbol of an object within the field of view when the object passes through the scan volume. The lid may be coupled to the at least one sidewall of the body via a hinge. At least a portion of the machine-readable symbol reader may be positioned above the top surface of the lid to direct the field of view across the lid, and at least a portion of the field of view may be directed downward from the machine-readable symbol reader.

The machine-readable symbol reader system may further include a checkout stand that includes a cash box reception portion shaped and sized to receive the cash box therein. The checkout stand may include a top work surface, and the cash box reception portion may be shaped and sized so the lid of the cash box is level with the top work surface of the checkout stand when the cash box is disposed within the cash box reception portion.

The machine-readable symbol reader system may further include a bottom machine-readable symbol reader positioned distal of the cash box reception portion, the bottom machine-readable symbol reader has a field of view directed upward to capture an image of a side of the object facing downward, and the field of view of the bottom machine-readable symbol reader at least partially defines the scan volume.

The machine-readable symbol reader system may further include a power delivery system that includes: a first coil electrically coupled to a power source; and a second coil inductively coupled to the first coil and electrically coupled to the machine-readable symbol reader. The power delivery system may transmit data via the first coil and the second coil.

The machine-readable symbol reader system may further include a wireless communications interface operatively coupled to the machine-readable symbol reader, the wireless communications interface transmits data from the machine-readable symbol reader to at least one external computing device or receives data at the machine-readable symbol reader from at least one external communication device.

A method of reading a machine-readable symbol on an object may be summarized as including providing a work surface having a front edge at which an operator may be positioned, the work surface includes a movable surface portion disposed proximate the front edge, the movable surface portion movable to selectively provide the operator access to a volume disposed below the movable surface portion; and coupling a machine-readable symbol reader to the movable surface portion of the work surface, the machine-readable symbol reader having a field of view directed away from the front edge of the work surface, the field of view at least partially defines a scan volume, and the machine-readable symbol reader reads the machine-readable symbol on the object within the field of view when the object is passed through the scan volume.

The method may further include capturing an image of a first side of the object with the machine-readable symbol reader as the object passes through the scan volume; and processing the image of the first side of the object to identify a machine-readable symbol.

A method of reading a machine-readable symbol on an object may be summarized as including providing a cash box that includes: a body having a bottom wall and at least one sidewall extending upwardly from the bottom wall, the at least one sidewall defines an open top; and a lid pivotally coupled to the at least one sidewall to selectively close the open top, the lid includes a front portion, a rear portion, a top surface, and a bottom surface opposite the top surface; and physically coupling a machine-readable symbol reader to the lid, the machine-readable symbol reader extends upward from the top surface of the lid, the machine-readable symbol reader having a field of view directed toward the rear portion of the lid, the field of view at least partially defines a scan volume, and the machine-readable symbol reader reads a machine-readable symbol of an object within the field of view when the object passes through the scan volume.

The method may further include providing a checkout stand that includes a cash box reception portion; positioning the cash box within the cash box reception portion; capturing an image of a first side of the object with the machine-readable symbol reader as the object passes through the scan volume; and processing the image of the first side of the object to identify a machine-readable symbol.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with machine-readable symbol reader systems have not been shown or described in detail to avoid unnecessarily obscuring descriptions of the embodiments.

Unless the context requires otherwise, throughout the specification and claims that follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Embodiments of the present disclosure provide systems and methods for utilizing a cash box (or a thin cover placed over a cash box) as part of a machine-readable symbol reader system operative to read the vertically oriented faces of objects passed through a scan volume. The placement of a machine-readable symbol reader in the systems of the disclosed embodiments is such that the reader is very close to the operator's body and does not interfere with the operator's arm movements.

Figure 1:
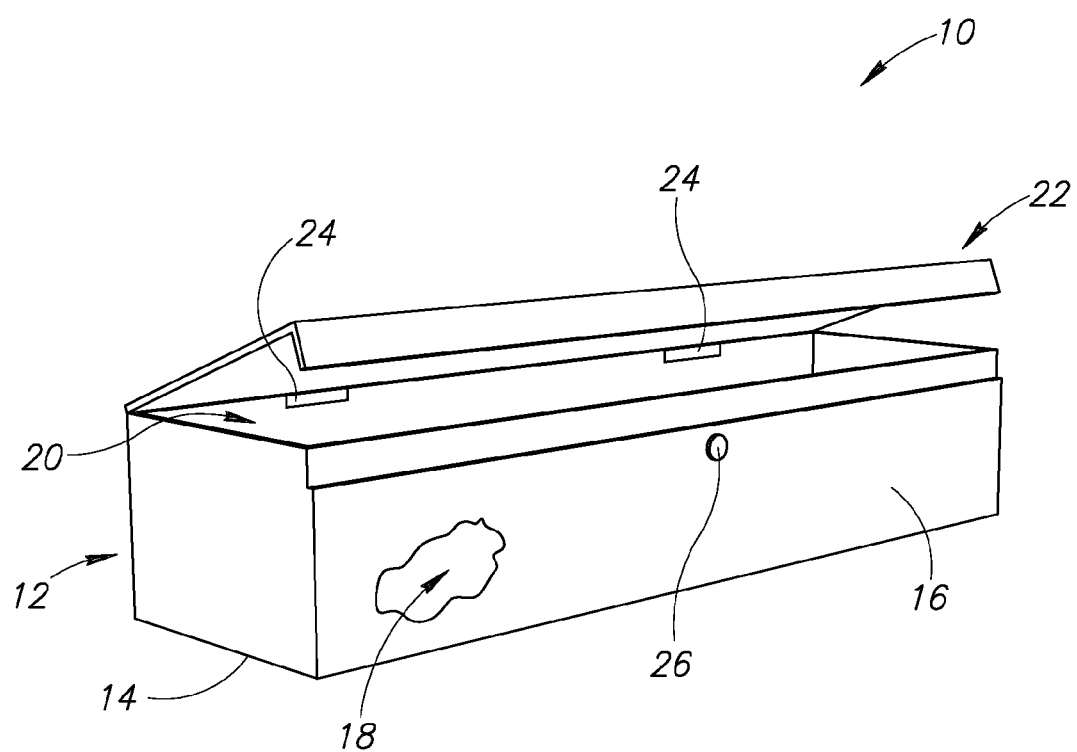
FIG. 1 is a front perspective view of a conventional cash box.
Figure 2:
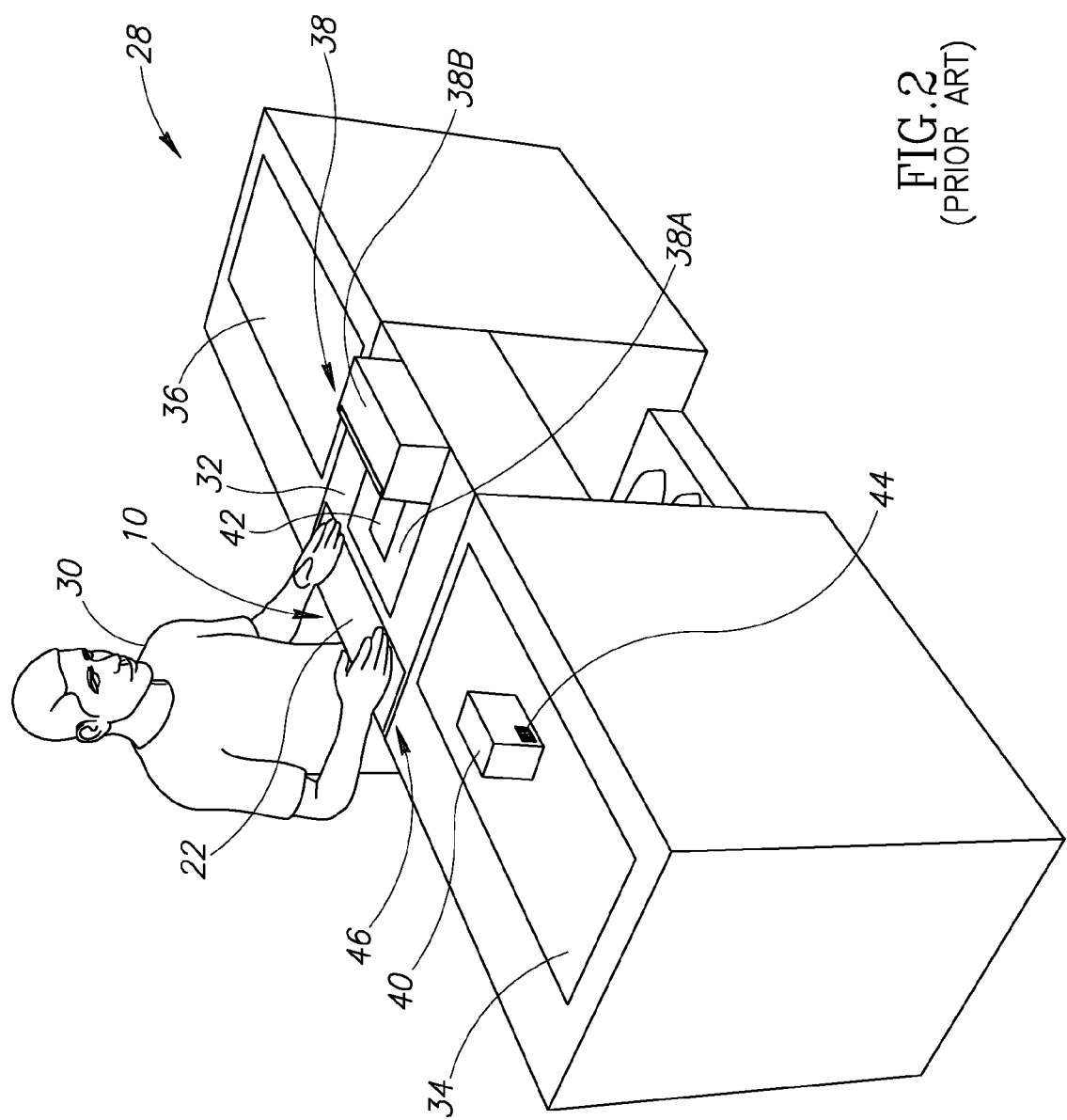
FIG. 2 is a rear left side perspective view of a checkout stand.
Figure 3:
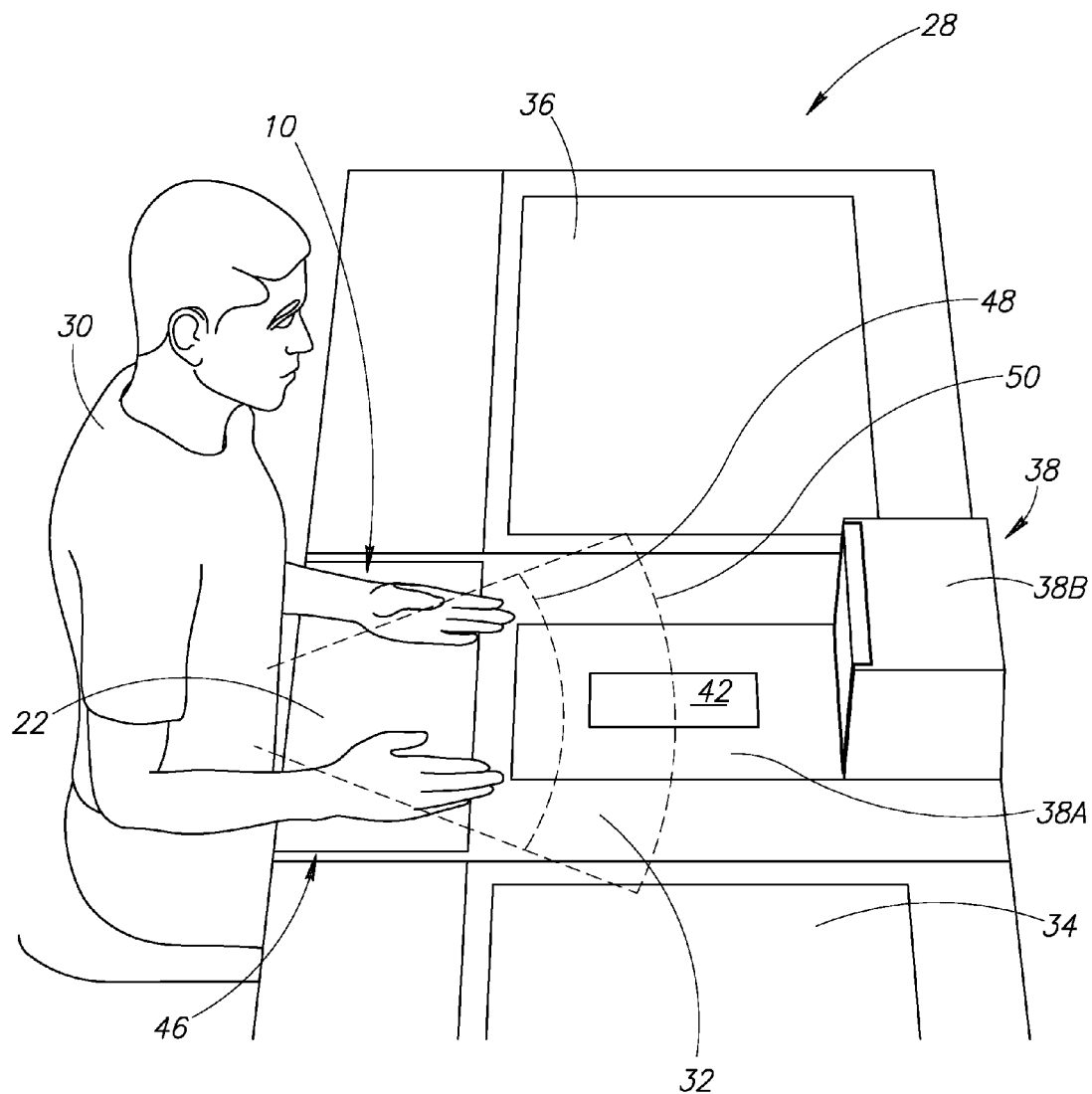
FIG. 3 is a top left side perspective view of the checkout stand of FIG. 2.
Figure 4:
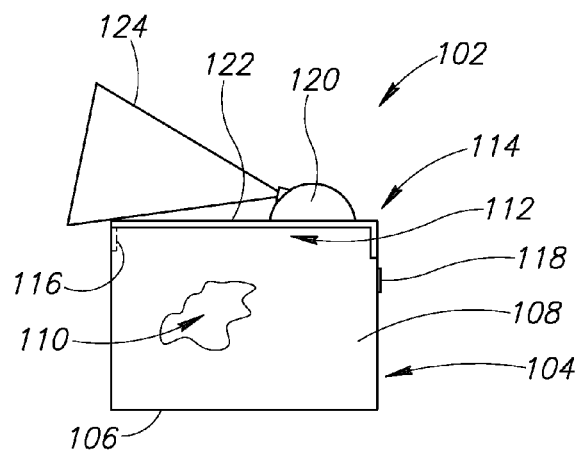
FIG. 4 is a left side elevational view of a machine-readable symbol reader system, according to at least one illustrated embodiment.
Figure 5:
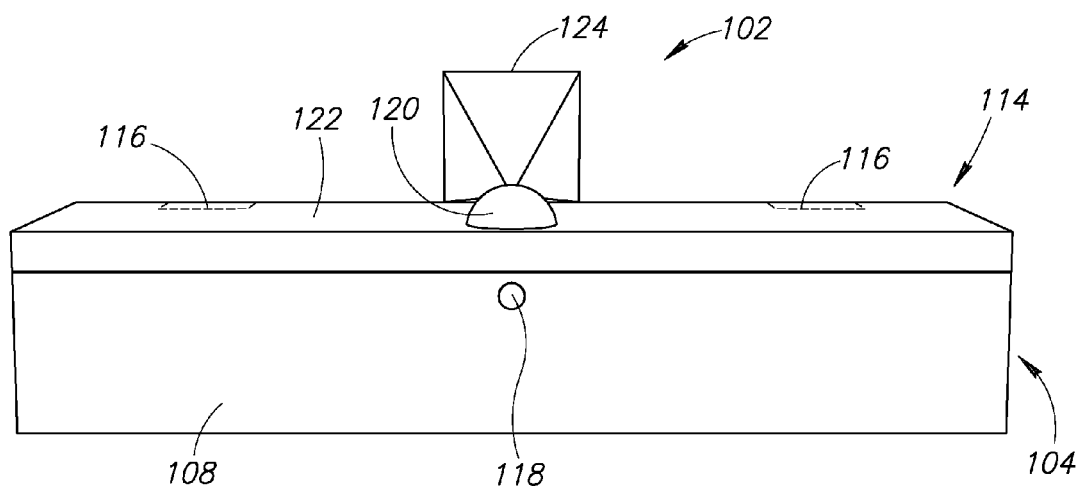
FIG. 5 is a rear perspective view of the machine-readable symbol reader system of FIG. 4, according to at least one illustrated embodiment.

FIGS. 4-8 depict various views of a checkout stand system 100. As shown in FIGS. 4 and 5, the checkout stand system 100 includes a "flip-lid" type cash box 102 that includes a base or body 104 having a bottom wall 106 and sidewalls 108 extending upwardly therefrom. The bottom wall 106 and sidewalls 108 together define an interior volume 110 in which currency (e.g., bills, coins, checks, etc.) may be placed. In the illustrated embodiment, the cash box 102 has a rectangular shape that includes a front sidewall and an opposing rear sidewall, and a left sidewall and an opposing right sidewall. Other shapes for the cash box 102 may also be implemented. The cash box 102 includes a top opening 112 disposed at the uppermost portions of the sidewalls 108 that allows access to the volume 110. The cash box 102 also includes a lid 114 pivotally attached to the body 104 via hinges 116. The lid 114 is pivotable between an open position and a closed position to regulate access to the interior volume 110 via the top opening 112. The cash box 102 may be provided with a locking mechanism 118 that, for example, may be operated with a key.

Figure 10:
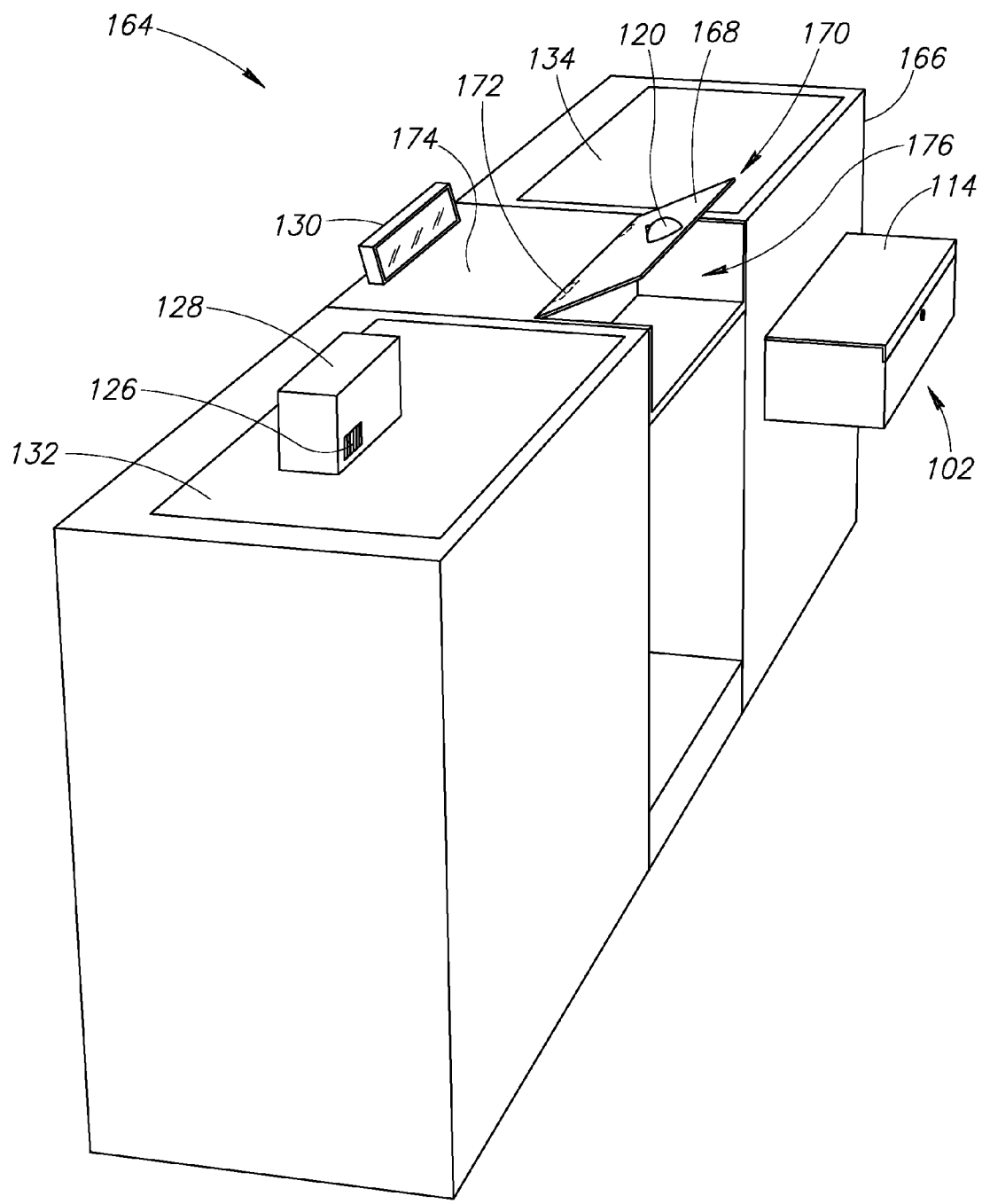
FIG. 10 is a rear left side perspective view of a checkout stand that includes a pivotal cover having a machine-readable symbol reader attached thereto, the pivotal cover in an opened position to provide access to a volume shaped and sized to receive a cash box, according to at least one illustrated embodiment.
Figure 11:
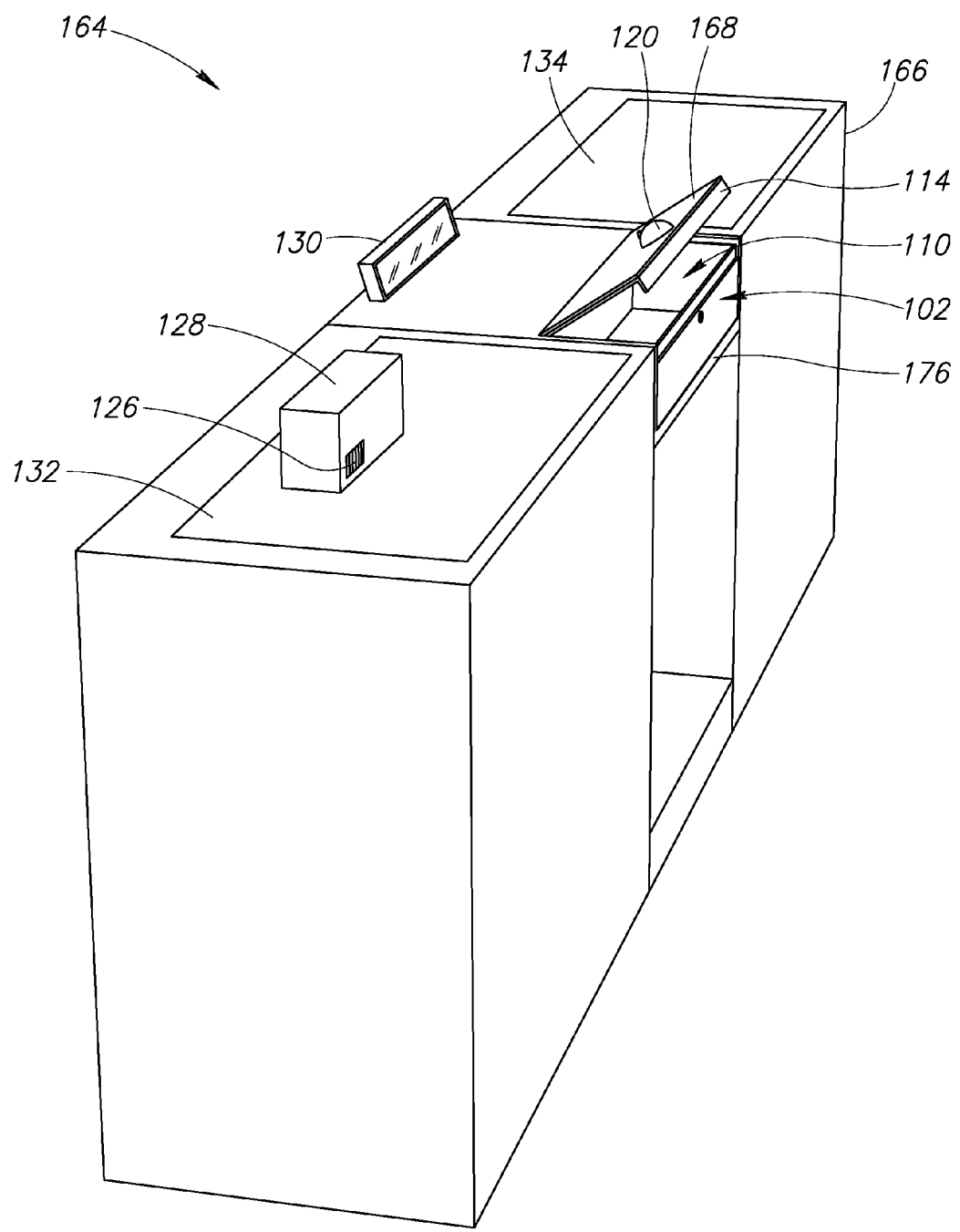
FIG. 11 is a rear left side perspective view of the checkout stand of FIG. 10, the cash box positioned within the volume, the pivotal cover and a lid of the cash box in an opened position to provide access to an interior volume of the cash box, according to at least one illustrated embodiment.
Figure 12:
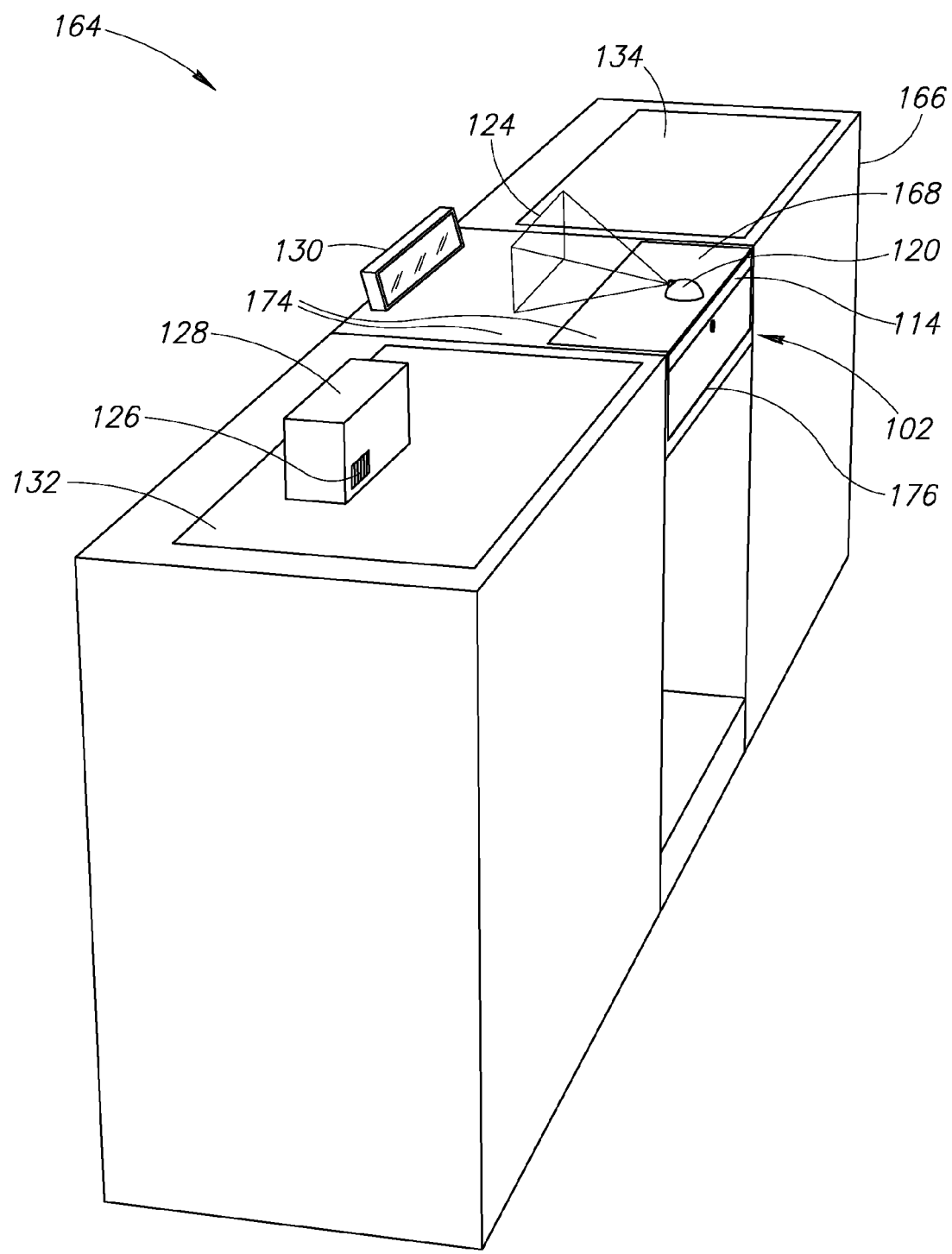
FIG. 12 is a rear left side perspective view of the checkout stand of FIG. 10, the cash box positioned within the volume, the pivotal cover and the lid of the cash box in a closed position, according to at least one illustrated embodiment.

A small, machine-readable symbol reader 120 is mounted upon a top surface 122 of the lid 114 of the cash box 102. The top surface 122 on which the reader 120 resides may be the lid 114 of the cash box 102, as shown in the embodiment of FIGS. 4-8, or may be a thin top cover disposed over the lid of the cash box, as shown in the embodiment of FIGS. 10-12, discussed below. The reader 120 includes a field of view (FOV) 124 directed away from a front side of the cash box 102 and toward a rear side of the cash box. The FOV 124 of the reader 120 is the region over which the reader may view and read machine-readable symbols 126 (FIG. 7) associated with objects 128.

Although the embodiment of FIGS. 4-8 are illustrated as the checkout stand system 100, the present disclosure may be used in other suitable applications, such as a self-checkout apparatus, package handling apparatus (such as used by the postal service, delivery and courier services, or airport baggage handling), or an object routing apparatus used to route objects during manufacturing processes, where it is useful for a machine to recognize objects and tally or process the recognized objects upon a tallying event.

Figure 6:
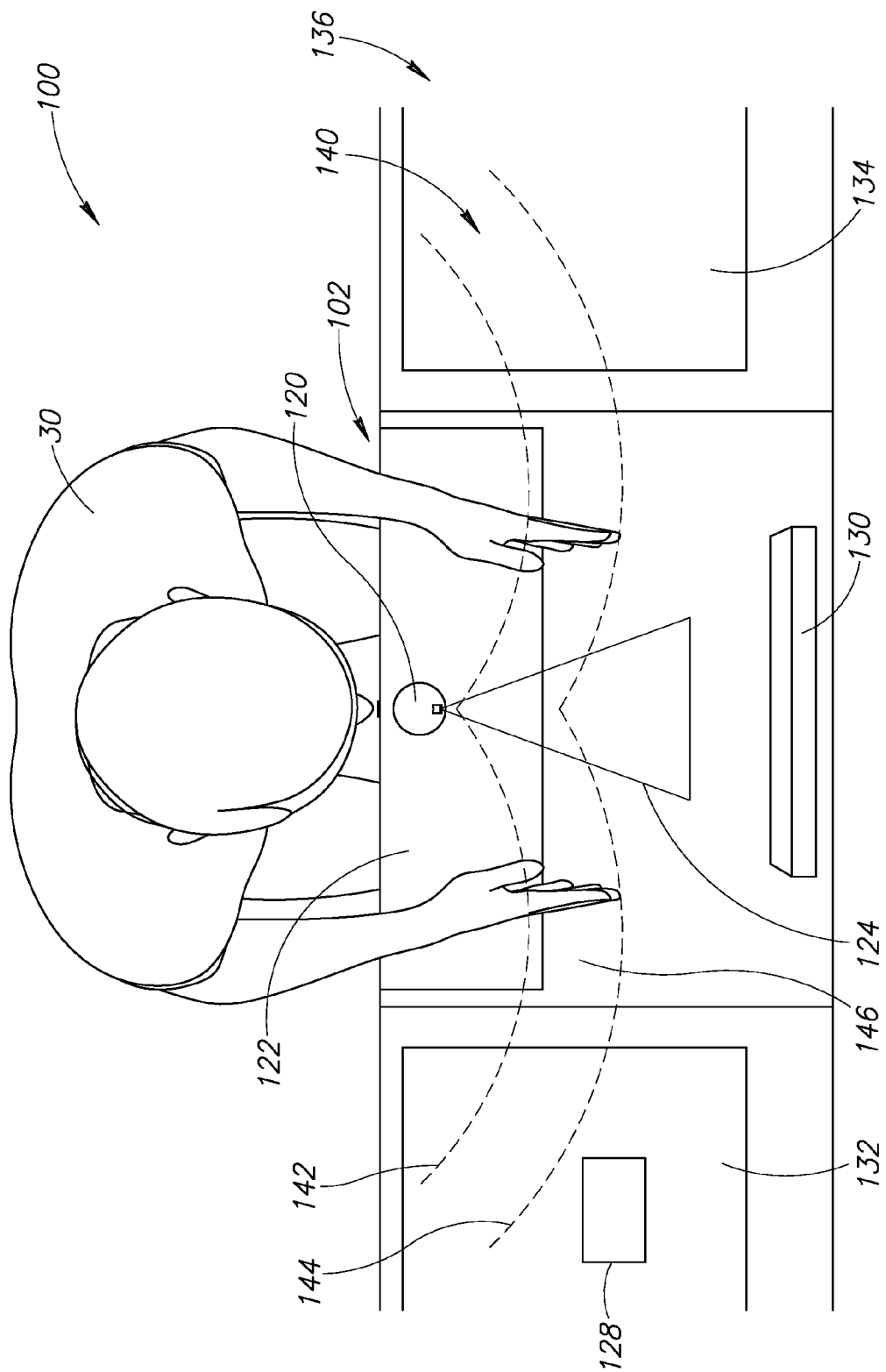
FIG. 6 is a top plan view of a checkout stand that includes the machine-readable symbol reader system of FIG. 4, according to at least one illustrated embodiment.
Figure 7:
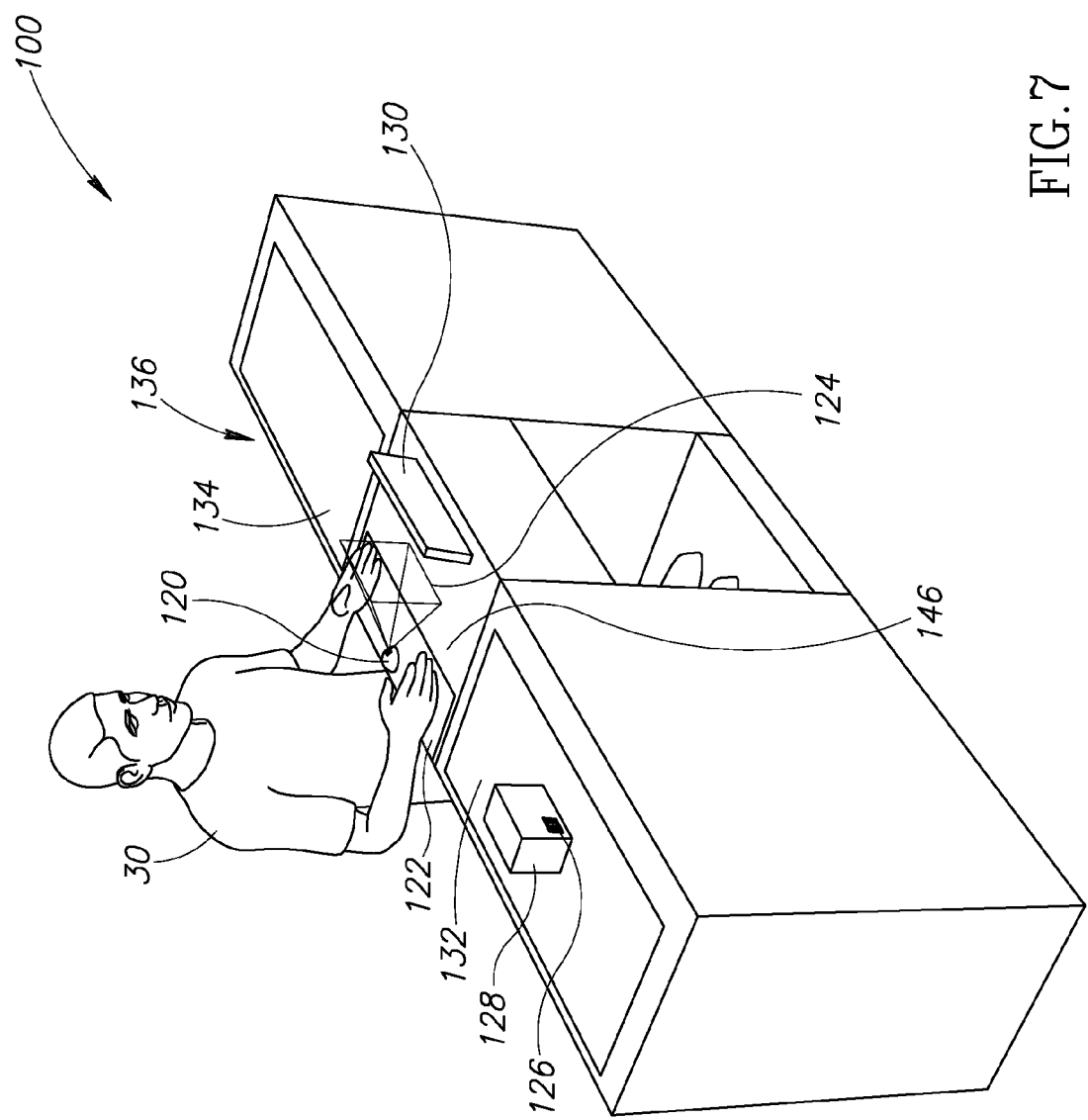
FIG. 7 is a rear left side perspective view of the checkout stand of FIG. 6, according to at least one illustrated embodiment.
Figure 8:
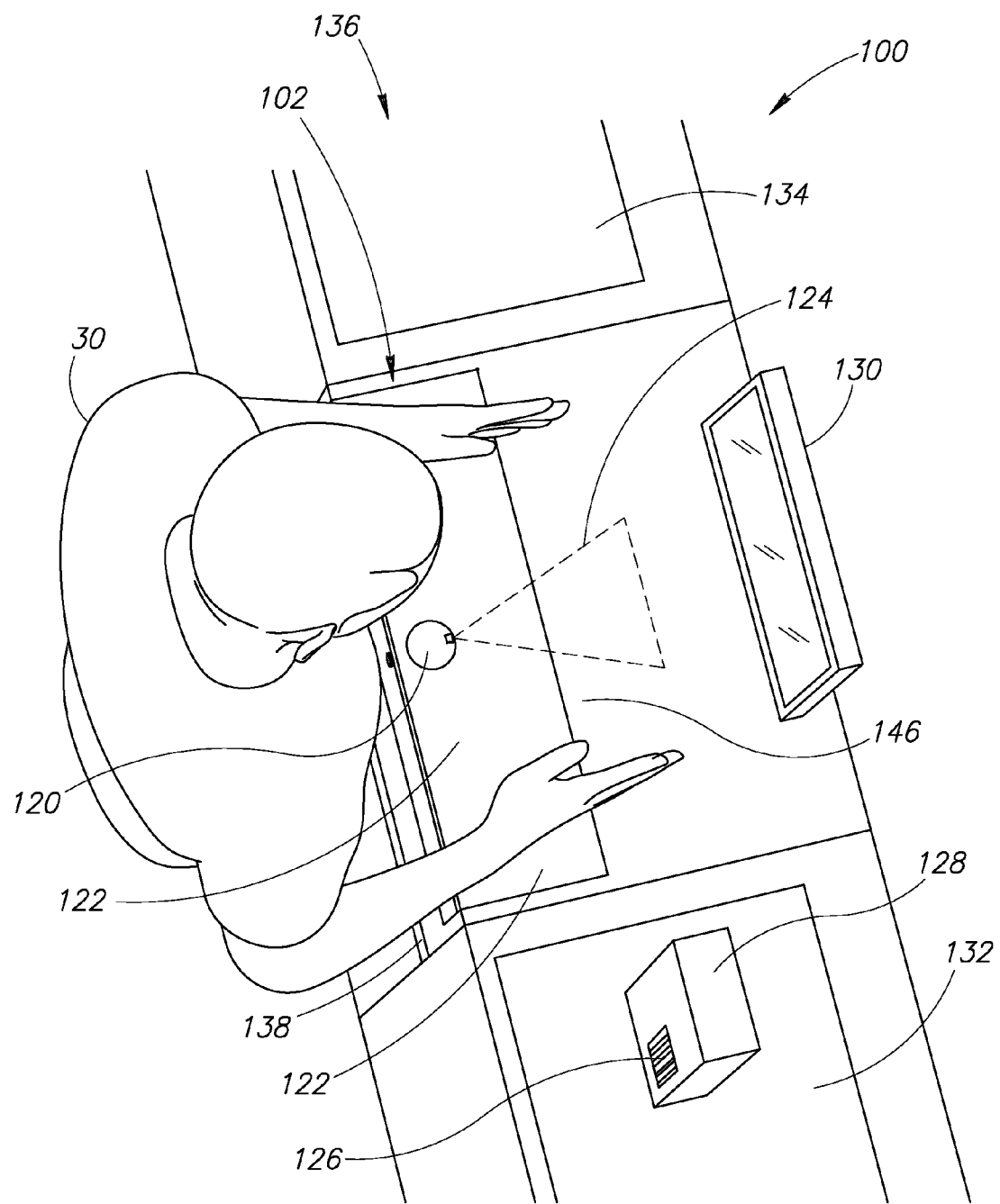
FIG. 8 is a front left side perspective view of the checkout stand of FIG. 6, according to at least one illustrated embodiment.

As shown in FIGS. 6-8, the checkout stand system 100 includes a computer 130 operatively coupled to the reader 120. The computer 130 may host or communicate with a POS system. The computer 130 may include a cash register or any other suitable device having a digital processor, central processing unit, or other suitable computing element. The reader 120 may be a scanner utilizing optical means to capture data, such as lasers or imaging cameras. Generally, the reader 120 may be any suitable line of sight device used to capture information. The reader 120 may include one or more complementary metal-oxide semiconductor ("CMOS") imagers. The reader 120 may include one or more cameras with one or more CMOS imagers operatively connected with a processor, or computer system, and associated memory. Other suitable imagers may be used, such as, but not limited to, digital imagers including a CMOS imager, a charged coupled device ("CCD") imager, and analog imagers operatively connected to a digitizer. The reader 120 may collect information in many ways. Therefore, references to scanning, reading, and gathering information should be understood to be inclusive of one another as well as inclusive of other manners for collecting information.

The reader 120 is operatively connected to the computer 130, for example, via a physical transmission line or via wireless communication equipment and protocols. The computer 130 may be positioned at the checkout stand system 100, or may be positioned remotely. Software for processing images from the reader 120 may reside in the reader itself, on the computer 130, a combination of the two, and/or other local or remote computer systems. Processing images may include searching for and decoding optical codes, such as universal product codes ("UPC"), on objects 128. Objects 128 may be recognized through image analysis, such as by scale invariant feature transformation. A combination of image analysis and optical code decoding may also be used to recognize objects 128 by the reader 120.

An input conveyor belt 132 receives objects 128 from a customer and conveys the objects towards the reader 120. Alternately, the conveyor belt 132 may be replaced with a generally flat surface that does not move, and the objects 128 may be pushed or otherwise moved towards the reader 120. In this embodiment, an exit conveyor belt 134 receives objects 128 from the operator 30 after the objects have been scanned or read by the reader 120 and transports the objects toward a loading or bagging zone 136.

As shown in FIGS. 6-8, the cash box 102 is positioned in its conventional location at a cash box reception portion 138 (FIGS. 8 and 9), such as a shelf, located at a front side of the checkout stand system 100 adjacent the operator 30. The placement of the reader 120 directly over the area occupied by the cash box 102 allows the reader to be positioned relatively close to the body of the operator 30. Because of this feature, the sweep of the arms and hands of the operator 30 are not interfered with by the reader 120, and the operator can scan at least some objects 128 closer to his body, which is highly desirable ergonomically.

FIG. 6 shows an ergonomically desirable work zone 140 for the reach of the arms of the operator 30. The zone 140 extends between the dashed arc lines 142 and 144. As can be seen in FIG. 6, as the operator 30 moves objects 128 along the checkout stand from the input conveyor belt 132, across a central work surface 146, which includes the top surface 122 of the lid 114 of the cash box 102, to the exit conveyor belt 134, the arms and hands of the operator follow the general paths contained between the pair of arc lines 142 and 144. Advantageously, the arms and hands of the operator 30 do not collide with the reader 120, which protrudes upwardly from the top surface 122 of the lid 114 of the cash box 102.

Since the reader 120 in the illustrated embodiment is positioned directly over the cash box 102, as opposed to being displaced distal from the cash box as in conventional checkout stands, the required depth for the checkout stand system 100 may be reduced. This feature advantageously reduces the amount of valuable floor space required in a retail environment (e.g., a grocery store, a department store, etc.). Additionally, because the reader 120 in some embodiments protrudes slightly above the work surface 146 (e.g., the top surface 122 of the lid 114 and surrounding countertop) upon which it resides, the field of view 124 of the reader may extend essentially all the way down to the work surface so that machine-readable symbols 126 (FIG. 8) on objects 128 will not pass under the view of the reader during scanning operations.

Figure 9:
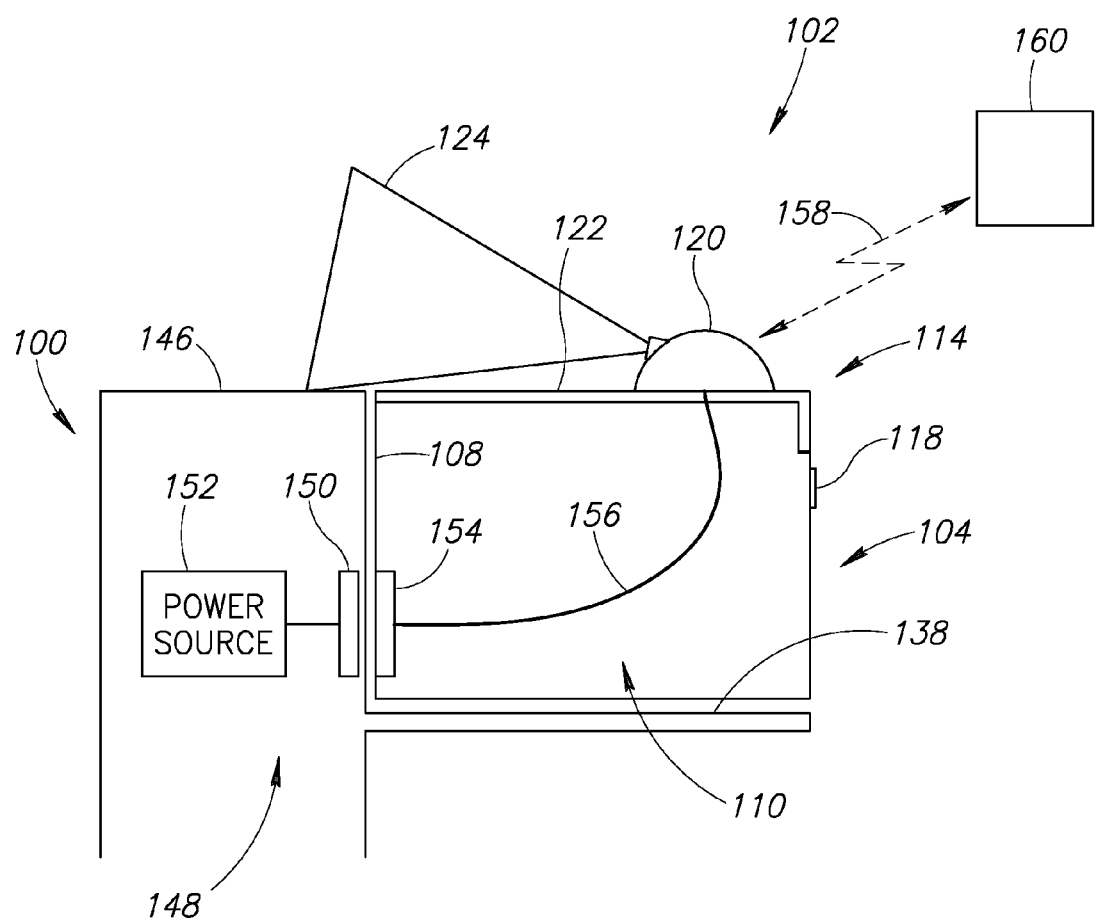
FIG. 9 is a left side elevational view of a machine-readable symbol reader system, according to at least one illustrated embodiment.

FIG. 9 shows a power delivery and communication system for the machine-readable symbol reader. In this example, the reader 120 obtains power through a resonant air core transformer power delivery system 148. A first winding or coil 150 of a transformer of the resonant air core transformer power delivery system 148 receives power from a power source 152. The power source 152 may, for example, be an AC main power source accessible via an outlet coupled to the checkout stand 100. The first winding 150 may be coupled to the cash box reception portion 138 of the checkout stand 100. When the cash box 102 is positioned in the cash box reception portion 138, the first coil 150 is inductively coupled to a second winding or coil 154 of the resonant air core transformer power delivery system 148 that is coupled to a rear sidewall 108 of the cash box. Power is transferred from the power source 152, to the first coil 150, and to the second coil 154. Power is transferred from the second coil 154 to the reader 120 via a cable 156, which may be positioned inside the cash box 102 within the interior volume 110.

Data and control communication for the reader 120 may be provided by a wireless interface through a wireless link 158 to one or more external devices 160 (e.g., a transponder coupled to a computing system via a network). Data and control communication for the reader 120 may also be provided along with power delivery through the resonant air core transformer power delivery system 148.

In the embodiment of FIG. 9, at the end of an operator's shift, the entire cash box 102 may be removed from the checkout stand 100 and replaced with a similarly configured cash box for the next operator. No connectors or contacts need to be mated, which is advantageous. In other embodiments, the cash box 102 may include one or more connectors or contacts (e.g., "docking" components) that facilitate coupling with one or more power sources or one or more data communication devices. The wireless power delivery and communication system may include various components such as an AC-DC power stages, coil drivers, rectifiers, voltage regulation circuits, and wireless power controllers.

FIGS. 10-12 show a machine-readable symbol reader system 164 in which the reader 120 remains with a checkout stand 166, rather than being mounted to the lid 114 of the removable cash box 102. In this embodiment, the reader 120 is affixed to a top surface 168 of a thin cover 170 pivotally attached via hinges 172 to the checkout stand 166. When the cover 170 is in a closed position shown in FIG. 12, the top surface 168 of the cover becomes a portion of a work surface 174 over which objects 128 being scanned by the operator 30 (FIGS. 6-8) may be moved. When the cover 170 is in an opened position as shown in FIG. 10, the cash box 102 may be positioned within a cash box reception volume or portion 176 in the checkout stand 166 below the cover 170. As shown in FIG. 11, during a transaction, the operator may simultaneously lift the lid 114 of the cash box 102 and the pivotal cover 170 to obtain access to currency (not shown) disposed within the interior volume 110 of the cash box. In some embodiments, the pivotal cover 170 may include a fastener (not shown) that selectively couples the lid 114 of the cash box 102 to the cover so that the lid and the cover more readily move together as the operator pivots the lid of the cash box between its opened and closed positions.

In the embodiment of FIGS. 10-12, since the reader 120 is not removed with the cash box 102, the reader may be directly wired to a power supply and POS system without utilizing wireless power or communication interfaces. Moreover, the embodiment of FIGS. 10-12 may be implemented utilizing conventional cash boxes without modification.

Figure 13:
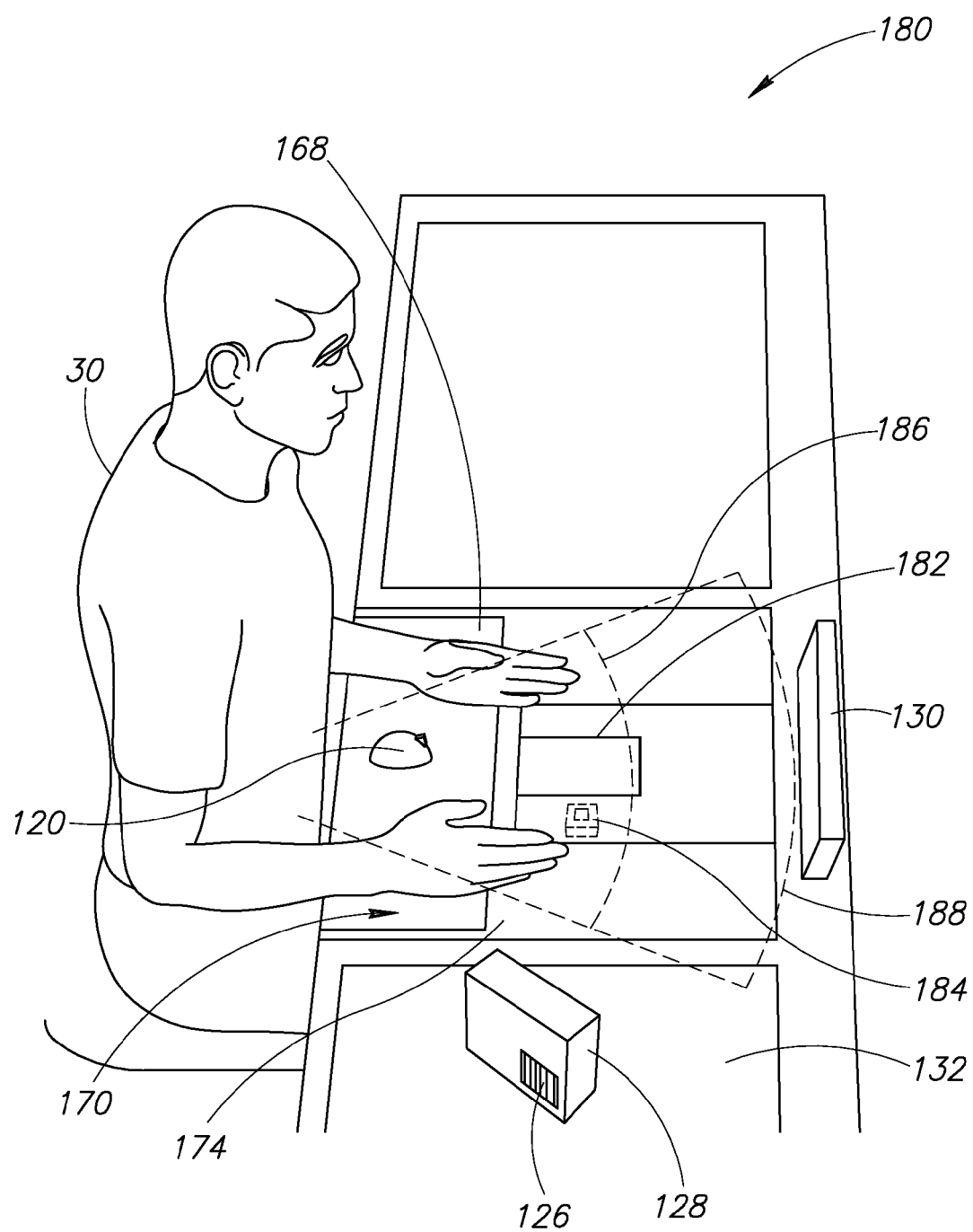
FIG. 13 is a top left side perspective view of a checkout stand that includes a horizontal machine-readable symbol reader and a vertical machine-readable symbol reader, according to at least one illustrated embodiment.

FIG. 13 illustrates another embodiment of a machine-readable symbol reader system 180. In this example, a window 182 of a bottom or horizontal machine-readable symbol reader 184 is positioned adjacent to and behind the thin cover 170 (or, alternatively, behind the lid 114 of the cash box 102 in the embodiment of FIGS. 4-8). The horizontal reader 184 and the vertical reader 120 mounted on the cover 170 work in concert to read machine-readable symbols 126 on objects 128 passing through a scan volume defined by the fields of view of the readers. This configuration places nearly the entire scan volume within a preferred work zone 186. Additionally, the horizontal window 182 acts as a scanning "target" positioned a few inches away from the vertical reader 120. Since the field of view 124 (FIG. 12) of the vertical reader 120 may be relatively small very close to the vertical reader, positioning an object over the horizontal window 182 a few inches away from the vertical reader where the field of view is relatively larger allows a larger area to be scanned by the vertical reader.

The combination of the horizontal reader 184 and the vertical reader 120 creates a highly ergonomic scanning system having an optimal scan zone that is within a very comfortable reach for the operator 30. As shown in FIG. 13, the operator 30 may scan objects substantially entirely within the preferred work zone 186 or a maximum work zone 188.

An added advantage is that because the vertical reader 120 has its general view facing in the same direction of the operator 30, the operator may face the machine-readable symbols 126 of objects 128 toward the operator's own visual field so that if the operator can see the machine-readable symbols, the reader 120 can see the machine-readable symbols 126 as well.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of nontransitory signal bearing media used to actually carry out the distribution. Examples of nontransitory signal bearing media include, but are not limited to, the following: recordable type media such as floppy disks, hard disk drives, CD ROMs, digital tape, and computer memory.

The various embodiments described above can be combined to provide further embodiments. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A machine-readable symbol reader system, comprising:
a work surface having a front edge at which an operator may be positioned, the work surface includes a movable surface portion disposed proximate the front edge, the movable surface portion movable to selectively provide the operator access to a cash box disposed below the movable surface portion; and
a machine-readable symbol reader physically coupled to the movable surface portion of the work surface to move therewith, the machine-readable symbol reader has a field of view directed away from the front edge of the work surface, the field of view at least partially defines a scan volume, and the machine-readable symbol reader reads a machine-readable symbol of an object within the field of view when the object passes through the scan volume.

2. The machine-readable symbol reader system of claim 1 wherein the movable surface portion of the work surface is in the form of a lid of a cash box.

3. The machine-readable symbol reader system of claim 1 wherein the movable surface portion is pivotal about a hinge.

4. The machine-readable symbol reader system of claim 1 wherein at least a portion of the machine-readable symbol reader is positioned above a plane of the work surface to direct the field of view across the work surface, and at least a portion of the field of view is directed downward from the machine-readable symbol reader.

5. The machine-readable symbol reader system of claim 1 wherein the movable surface portion pivots into a first position in which the movable surface portion is level with an adjacent, non-movable surface portion of the work surface.

6. The machine-readable symbol reader system of claim 1 wherein the work surface is part of a checkout stand.

7. The machine-readable symbol reader system of claim 1, further comprising:
a bottom machine-readable symbol reader positioned below the work surface and distal of the movable surface portion, the work surface comprises a window, the bottom machine-readable symbol reader has a field of view directed upward through the window to capture an image of a side of the object facing downward, and the field of view of the bottom machine-readable symbol reader at least partially defines the scan volume.

8. The machine-readable symbol reader system of claim 1, further comprising:
an input conveyor system that transports objects toward the scan volume; and
a loading zone that receives objects transported through the scan volume.

9. A machine-readable symbol reader system, comprising:
a cash box positionable at a checkout stand proximate a front edge thereof at which an operator may be positioned, the cash box includes:
  a body having a bottom wall and at least one sidewall extending upwardly from the bottom wall, the at least one sidewall defines an open top; and
  a lid pivotally coupled to the at least one sidewall to selectively close the open top, the lid includes a top surface and a bottom surface opposite the top surface; and
a machine-readable symbol reader physically coupled to the lid to move therewith, the machine-readable symbol reader extends upward from the top surface of the lid, the machine-readable symbol reader has a field of view directed away from the front edge of the checkout stand when the cash box is positioned at the checkout stand, the field of view at least partially defines a scan volume, and the machine-readable symbol reader reads a machine-readable symbol of an object within the field of view when the object passes through the scan volume.

10. The machine-readable symbol reader system of claim 9 wherein the lid is coupled to the at least one sidewall of the body via a hinge.

11. The machine-readable symbol reader system of claim 9 wherein at least a portion of the machine-readable symbol reader is positioned above the top surface of the lid to direct the field of view across the lid, and at least a portion of the field of view is directed downward from the machine-readable symbol reader.

12. The machine-readable symbol reader system of claim 9, further comprising:
a checkout stand that includes a cash box reception portion shaped and sized to receive the cash box therein.

13. The machine-readable symbol reader system of claim 12 wherein the checkout stand includes a top work surface, and the cash box reception portion is shaped and sized so the lid of the cash box is level with the top work surface of the checkout stand when the cash box is disposed within the cash box reception portion.

14. The machine-readable symbol reader system of claim 12, further comprising:
a bottom machine-readable symbol reader positioned distal of the cash box reception portion, the bottom machine-readable symbol reader has a field of view directed upward to capture an image of a side of the object facing downward, and the field of view of the bottom machine-readable symbol reader at least partially defines the scan volume.

15. The machine-readable symbol reader system of claim 9, further comprising:
a power delivery system that includes:
  a first coil electrically coupled to a power source; and
  a second coil inductively coupled to the first coil and electrically coupled to the machine-readable symbol reader.

16. The machine-readable symbol reader system of claim 15 wherein the power delivery system transmits data via the first coil and the second coil.

17. The machine-readable symbol reader system of claim 9, further comprising:
a wireless communications interface operatively coupled to the machine-readable symbol reader, the wireless communications interface transmits data from the machine-readable symbol reader to at least one external computing device or receives data at the machine-readable symbol reader from at least one external communication device.

18. A method of reading a machine-readable symbol on an object, the method comprising:
providing a work surface having a front edge at which an operator may be positioned, the work surface includes a movable surface portion disposed proximate the front edge, the movable surface portion movable to selectively provide the operator access to a cash box disposed below the movable surface portion; and
coupling a machine-readable symbol reader to the movable surface portion of the work surface, the machine-readable symbol reader having a field of view directed away from the front edge of the work surface, the field of view at least partially defines a scan volume, and the machine-readable symbol reader reads the machine-readable symbol on the object within the field of view when the object is passed through the scan volume.

19. The method of claim 18, further comprising:
capturing an image of a first side of the object with the machine-readable symbol reader as the object passes through the scan volume; and
processing the image of the first side of the object to identify a machine-readable symbol.

20. A method of reading a machine-readable symbol on an object, the method comprising:
providing a cash box that includes:
  a body having a bottom wall and at least one sidewall extending upwardly from the bottom wall, the at least one sidewall defines an open top; and
  a lid pivotally coupled to the at least one sidewall to selectively close the open top, the lid includes a front portion, a rear portion, a top surface, and a bottom surface opposite the top surface; and
physically coupling a machine-readable symbol reader to the lid, the machine-readable symbol reader extends upward from the top surface of the lid, the machine-readable symbol reader having a field of view directed toward the rear portion of the lid, the field of view at least partially defines a scan volume, and the machine-readable symbol reader reads a machine-readable symbol of an object within the field of view when the object passes through the scan volume.

21. The method of claim 20, further comprising:
providing a checkout stand that includes a cash box reception portion;
positioning the cash box within the cash box reception portion;
capturing an image of a first side of the object with the machine-readable symbol reader as the object passes through the scan volume; and processing the image of the first side of the object to identify a machine-readable symbol.

* * * * *